United States Patent
Fujita et al.

(10) Patent No.: US 10,563,020 B2
(45) Date of Patent: Feb. 18, 2020

(54) PROCESS FOR PRODUCING DISPERSION CONTAINING ELECTROCONDUCTIVE POLYMER

(71) Applicant: SHOWA DENKO K.K., Tokyo (JP)

(72) Inventors: Miyo Fujita, Tatsuno (JP); Motoaki Araki, Tatsuno (JP); Takashi Ohkubo, Himeji (JP)

(73) Assignee: SHOWA DENKO K.K., Tokyo (JP)

( * ) Notice: Subject to any disclaimer, the term of this patent is extended or adjusted under 35 U.S.C. 154(b) by 63 days.

(21) Appl. No.: 15/776,841

(22) PCT Filed: Dec. 1, 2016

(86) PCT No.: PCT/JP2016/085720
§ 371 (c)(1),
(2) Date: May 17, 2018

(87) PCT Pub. No.: WO2017/115607
PCT Pub. Date: Jul. 6, 2017

(65) Prior Publication Data
US 2018/0371177 A1 Dec. 27, 2018

(30) Foreign Application Priority Data
Dec. 28, 2015 (JP) .................. 2015-257402

(51) Int. Cl.
*H01B 1/12* (2006.01)
*C08J 3/07* (2006.01)
*C08G 61/12* (2006.01)
*C08L 65/00* (2006.01)
*C08G 73/02* (2006.01)

(52) U.S. Cl.
CPC ............. *C08J 3/07* (2013.01); *C08G 61/126* (2013.01); *C08G 73/0266* (2013.01); *C08L 65/00* (2013.01); *H01B 1/124* (2013.01); *C08G 2261/12* (2013.01); *C08G 2261/1424* (2013.01); *C08G 2261/1522* (2013.01); *C08G 2261/312* (2013.01); *C08G 2261/3223* (2013.01); *C08G 2261/794* (2013.01); *C08J 2365/00* (2013.01)

(58) Field of Classification Search
CPC ..... C08L 65/00; C08L 25/18; C08G 2261/12; C08G 2261/1424; C08G 2261/1522; C08G 2261/312; C08G 2261/3223; C08G 2261/794; C08G 61/126; C08G 73/0266; C08J 2365/00; C08J 3/07
See application file for complete search history.

(56) References Cited

U.S. PATENT DOCUMENTS

| 2011/0049433 A1 | 3/2011 | Jonas et al. |
| 2015/0187504 A1 | 7/2015 | Takatani et al. |
| 2016/0024315 A1 | 1/2016 | Tagawa et al. |
| 2016/0055981 A1 | 2/2016 | Tagawa et al. |

FOREIGN PATENT DOCUMENTS

| CN | 104254568 A | 12/2014 |
| CN | 105143302 A | 12/2015 |
| JP | 7-90060 A | 4/1995 |
| JP | 2005-076016 A | 3/2005 |
| JP | 2010-132873 A | 6/2010 |
| JP | 2011-510141 A | 3/2011 |
| JP | 2014-152320 A | 8/2014 |
| JP | 2015-189804 A | 11/2015 |
| TW | 201505056 A | 2/2015 |
| WO | 2014/141367 A1 | 9/2014 |
| WO | WO-2014163202 A1 * | 10/2014 |

OTHER PUBLICATIONS

Pecher et al., "Nanoparticles of Conjugated Polymers", Chemical Reviews, American Chemical Society, vol. 110, No. 10, pp. 6260-6279, 2010, 20 pages total.

Daiki Wakizaka et al., "Hole transport in conducting ultrathin films of PEDOT/PSS prepared by layer-by-layer deposition technique", Polymer, Oct. 22, 2004, pp. 8561-8565, vol. 45.

International Search Report for PCT/JP2016/085720, dated Feb. 21, 2017.

* cited by examiner

Primary Examiner — Mark Kopec
Assistant Examiner — Jaison P Thomas
(74) Attorney, Agent, or Firm — Sughrue Mion, PLLC

(57) ABSTRACT

A method for producing a conductive polymer-containing dispersion, the method including a polymerization step of subjecting a monomer that is to be a constitutional unit of a conjugated conductive polymer to a polymerization reaction in a mixed solution containing the monomer, a polyanion, and a dispersion medium to produce a polymerized product; and a dispersion treatment step of performing a dispersion treatment on a reaction solution obtained in the polymerization step to prepare a dispersion of the polymerized product, wherein a dispersion medium is added one or more times at any point in time from after the polymerization step to during the dispersion treatment step to make a mass concentration (B) of the polymerized product in the dispersion after the dispersion treatment step lower than a mass concentration (A) of the polymerized product in the reaction solution.

14 Claims, No Drawings

PROCESS FOR PRODUCING DISPERSION CONTAINING ELECTROCONDUCTIVE POLYMER

CROSS REFERENCE TO RELATED APPLICATIONS

This application is a National Stage of International Application No. PCT/JP2016/085720 filed Dec. 1, 2016, claiming priority based on Japanese Patent Application No. 2015-257402 filed Dec. 28, 2015.

TECHNICAL FIELD

The present invention relates to a method for producing a conductive polymer-containing dispersion having low viscosity and excellent conductivity.

BACKGROUND ART

Conductive polymers are used in various applications such as conductive coating materials, antistatic agents, electromagnetic wave shielding materials, solid electrolytes, transparent conductive materials, battery materials, capacitor materials, sensor materials, conductive adhesives, electrophotographic materials, photosensitive members, and transfer members. Among the conductive polymers, polythiophene, polypyrrole, polyaniline, polyacethylene, polyphenylene, poly(p-phenylene vinylene), polyacene, polythiophene vinylene, and the like are known as conjugated conductive polymers to date.

Also, a technology is known in which a conjugated conductive polymer is doped with a polyanion such as polystyrene sulfonate (hereinafter also referred to as "PSS") as a counter anion in order to improve conductivity. In particular, PEDOT-PSS, in which poly(3,4-ethylenedioxythiophene) (hereinafter also referred to as "PEDOT") is used as a conjugated conductive polymer and PSS is used as a counter anion, can be obtained as an aqueous dispersion of a conductive polymer having excellent conductivity, and has excellent transparency and stability as well.

As a method for producing such a dispersion of a conjugated conductive polymer in which a polyanion is concomitantly present, for example, PTL 1 discloses subjecting a monomer that is to be a constitutional unit of a conjugated conductive polymer to oxidative polymerization in the presence of a polyanion and an organic sulfonic acid. PTL 2 discloses subjecting 3,4-ethylenedialkoxy thiophene to oxidative polymerization in the presence of a polyacid.

According to PTL 3, a low-viscosity dispersion containing polythiophene and PSS can be prepared in a short reaction time by polymerization through ultrasonic irradiation.

CITATION LIST

Patent Literature

PTL1: JP 2005-76016 A
PTL2: JP 7-90060 A
PTL3: JP 2011-510141 A

SUMMARY OF INVENTION

Technical Problem

Meanwhile, conductive polymers easily aggregate in a dispersion medium, and thus a dispersion containing a conductive polymer may become highly viscous in a dispersion treatment step. A highly viscous dispersion requires a large amount of energy for feeding the dispersion during mass production, and also requires a device with an increased breakdown pressure. In this regard, it is possible to reduce the viscosity of the dispersion by using a disperser, but such a process results in a reduced efficiency of producing the dispersion.

Accordingly, a conductive polymer-containing dispersion having high viscosity is problematic in that it is difficult to industrially handle the dispersion, and that the productivity of products using the dispersion is poor.

With production methods involving oxidative polymerization as described in PTL 1 and PTL 2, it is difficult to obtain a low-viscosity conductive polymer dispersion that is suitable for industrial handling. It is also difficult to obtain a dispersion that has excellent conductivity and sufficiently low viscosity by way of a method involving polymerization through ultrasonic irradiation to produce a conductive polymer-containing dispersion as described in PTL 3.

Research into the application of a conductive polymer-containing dispersion to highly functional, conductive products is in progress, and a further improvement in the conductivity of a conductive polymer is thus required.

The present invention has been made to solve the above technical problems, and an object of the invention is to provide a method for producing a conductive polymer-containing dispersion according to which method a low-viscosity dispersion containing a conjugated conductive polymer having excellent conductivity can be obtained with an improved production efficiency.

Solution to Problem

The present invention has been accomplished based on the finding that when subjecting a monomer to be formed into a conjugated conductive polymer to a polymerization reaction in a highly concentrated dispersion and then reducing the concentration of the obtained polymer to subject the polymer to a dispersion treatment, a conjugated conductive polymer-containing dispersion having excellent conductivity and low viscosity can be efficiently produced.

Specifically, the present invention provides [1] to [15] below.

[1] A method for producing a conductive polymer-containing dispersion, the method comprising:
a polymerization step of subjecting a monomer that is to be a constitutional unit of a conjugated conductive polymer to a polymerization reaction in a mixed solution comprising the monomer, a polyanion, and a dispersion medium to produce a polymerized product; and
a dispersion treatment step of performing a dispersion treatment on a reaction solution obtained in the polymerization step to prepare a dispersion of the polymerized product, wherein
the dispersion medium is added one or more times at any point in time after the polymerization step but before or during the dispersion treatment step to make a mass concentration (B) of the polymerized product in the dispersion after the dispersion treatment step lower than a mass concentration (A) of the polymerized product in the reaction solution.

[2] The method for producing a conductive polymer-containing dispersion according to [1], wherein the mass concentration (B) is not more than 0.95 times the mass concentration (A).

[3] The method for producing a conductive polymer-containing dispersion according to [1] or [2], wherein
the dispersion medium is added during the dispersion treatment step,
adding the dispersion medium is carried out after a time course of at least 10% of a time required for the dispersion treatment from a beginning of the dispersion treatment, and
the mass concentration (B) is not more than 0.95 times a mass concentration (C) of the polymerized product in the dispersion before the beginning of the dispersion treatment.

[4] The method for producing a conductive polymer-containing dispersion according to any one of [1] to [3], wherein the mixed solution comprises seed particles that have been converted into colloid protected by the polyanion.

[5] The method for producing a conductive polymer-containing dispersion according to any one of [1] to [4], wherein at least any of the polyanion and seed particles that have been converted into colloid protected by the polyanion is further added in the polymerization step.

[6] The method for producing a conductive polymer-containing dispersion according to any one of [1] to [5], further comprising a monomer dispersion preparation step of adding the monomer and the polyanion to the dispersion medium to prepare a dispersion of the monomer before the polymerization step.

[7] The method for producing a conductive polymer-containing dispersion according to [6], wherein the monomer dispersion comprises seed particles that have been converted into colloid protected by the polyanion.

[8] The method for producing a conductive polymer-containing dispersion according to [6] or [7], wherein the monomer is dispersed by ultrasonic irradiation in the monomer dispersion preparation step.

[9] The method for producing a conductive polymer-containing dispersion according to any one of [1] to [8], wherein the polymerized product is dispersed by ultrasonic irradiation in at least any of the polymerization step and the dispersion treatment step.

[10] The method for producing a conductive polymer-containing dispersion according to any one of [1] to [9], wherein
the dispersion medium in the mixed solution comprises water, and
the polymerization reaction is carried out with one or more oxidizing agents selected from the group consisting of peroxodisulfuric acid and a salt thereof.

[11] The method for producing a conductive polymer-containing dispersion according to any one of [1] to [10], wherein the polyanion is a polymer having a sulfonic acid group.

[12] The method for producing a conductive polymer-containing dispersion according to any one of [1] to [11], wherein a total amount of the polyanion used is an amount such that an anionic group in the polyanion is 0.25 to 30 mol per 1 mol of the monomer.

[13] The method for producing a conductive polymer-containing dispersion according to any one of [1] to [12], wherein the monomer comprises one or more selected from the group consisting of an optionally substituted pyrrole, an optionally substituted aniline, and an optionally substituted thiophene.

[14] The method for producing a conductive polymer-containing dispersion according to any one of [1] to [13], wherein the monomer comprises a compound represented by formula (1) below:

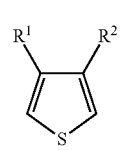

wherein $R^1$ and $R^2$ each independently represent any of a hydrogen atom, a hydroxyl group, an optionally substituted alkyl group having 1 to 18 carbon atoms, an optionally substituted alkoxy group having 1 to 18 carbon atoms, or an optionally substituted alkylthio group having 1 to 18 carbon atoms; or $R^1$ and $R^2$ are bonded to each other to form an optionally substituted alicyclic ring having 3 to 10 carbon atoms, an optionally substituted aromatic ring having 6 to 10 carbon atoms, an optionally substituted oxygen atom-containing heterocyclic ring having 2 to 10 carbon atoms, an optionally substituted sulfur atom-containing heterocyclic ring having 2 to 10 carbon atoms, or an optionally substituted sulfur atom and oxygen atom-containing heterocyclic ring having 2 to 10 carbon atoms.

[15] The method for producing a conductive polymer-containing dispersion according to any one of [4] to [14], wherein the seed particles are a polymer comprising an ethylenically unsaturated monomer as a constitutional unit.

Advantageous Effects of Invention

According to the production method of the present invention, a low-viscosity dispersion containing a conjugated conductive polymer having excellent conductivity can be produced. Accordingly, an improved efficiency of producing a conductive polymer-containing dispersion can be obtained, and also the dispersion has excellent handleability during mass production.

The conductive polymer obtained by the production method of the present invention has excellent conductivity. Therefore, the conductive polymer-containing dispersion obtained by the production method of the present invention is useful for producing conductive coating materials, antistatic films, solid electrolytes for electrolytic capacitors, various electronic components, and the like.

DESCRIPTION OF EMBODIMENTS

The present invention will now be described in detail below.

The method for producing a conductive polymer-containing dispersion of the present invention comprises a polymerization step of subjecting a monomer that is to be a constitutional unit of a conjugated conductive polymer to a polymerization reaction in a mixed solution comprising the monomer, a polyanion, and a dispersion medium to produce a polymerized product, and a dispersion treatment step of performing a dispersion treatment on a reaction solution obtained in the polymerization step to prepare a dispersion of the polymerized product. The method is characterized in that the dispersion medium is added one or more times at any point in time after the polymerization step but before or during the dispersion treatment step to make a mass concentration (B) of the polymerized product in the dispersion after the dispersion treatment step lower than a mass concentration (A) of the polymerized product in the reaction solution.

By controlling the concentration of the polymerized product in each of the polymerization step and the dispersion treatment step for the conjugated conductive polymer in this way, the conductivity of the obtained conjugated conductive polymer is improved, and a low-viscosity dispersion can be obtained.

The polyanion herein means a polymer having an anionic group. The "polymerization reaction" in the polymerization step of subjecting a monomer to a polymerization reaction to produce a polymerized product in the present invention means the polymerization reaction of the monomer that is to be a constitutional unit of a conjugated conductive polymer using an oxidizing agent.

[Control of Concentration of Polymerized Product]

In the present invention, the dispersion medium is added one or more times at any point in time after the polymerization step but before or during the dispersion treatment step to make the mass concentration (B) of the polymerized product in the dispersion after the dispersion treatment step lower than the mass concentration (A) of the polymerized product in the reaction solution obtained in the polymerization step, i.e., to satisfy (B)/(A)<1. In view of production efficiency, (B)/(A)≤0.95 is preferable, 0.10<(B)/(A)≤0.90 is more preferable, and 0.30<(B)/(A)≤0.85 is further preferable.

The mass concentration of the polymerized product herein corresponds to the concentration of the total mass of the monomer that is to be a constitutional unit of the conjugated conductive polymer and the polyanion, which are the composition of the polymerized product. When seed particles that have been converted into colloid protected by the polyanion are contained in the composition, the mass thereof is included in the total mass.

Thus, due to the concentration of the composition of the polymerized product being higher at the time of the polymerization reaction than the dispersion treatment step, i.e., the concentration of the monomer before reaction in the reaction solution being higher, the reaction efficiency of the polymerization reaction can be increased, and the conductivity of the obtained conjugated conductive polymer can be improved. Then, after the polymerization step, the polymerized product is diluted to lower the concentration of the polymerized product in the reaction solution (the dispersion) and is subjected to the dispersion treatment step, and thereby a low-viscosity dispersion can be obtained. Therefore, through such steps, an improved production efficiency of the conductive polymer-containing dispersion can be obtained.

In view of efficiently carrying out the polymerization reaction, the mass concentration (A) of the polymerized product in the reaction solution is preferably 0.25 to 25 mass %, and more preferably 0.5 to 10 mass %. In view of obtaining a low-viscosity dispersion, the mass concentration (B) of the polymerized product in the dispersion after the dispersion treatment step is preferably 0.2 to 20 mass %, and more preferably 0.4 to 8 mass %.

It is preferable in view of efficiently carrying out the dispersion treatment that the concentration adjustment for diluting the polymerized product involve adding the dispersion medium at least in the dispersion treatment step. This addition operation suppresses or reduces an increase in the viscosity of the reaction solution (the dispersion) due to an increased surface area resulting from pulverization of aggregated particles in the reaction solution by the dispersion treatment.

After the beginning of the dispersion treatment, adding the dispersion medium is preferably carried out after the viscosity of the dispersion reaches 125% or more of the viscosity before the beginning of the dispersion treatment, and is more preferably carried out after a time course of at least 10% of the time required for the dispersion treatment from the beginning of the dispersion treatment.

The mass concentration (B) is preferably not more than 0.95 times the mass concentration (C) of the polymerized product in the dispersion before the beginning of the dispersion treatment, i.e., preferably satisfies (B)/(C)≤0.95, more preferably, 0.10<(B)/(C)≤0.90, and further preferably 0.30<(B)/(C)≤0.85. By adjusting the concentration within such a numerical range, the dispersion treatment can be efficiently carried out, and aggregated particles can be sufficiently pulverized.

In view of efficiently carrying out the dispersion treatment, the mass concentration (C) of the polymerized product in the dispersion before the beginning of the dispersion treatment is preferably 0.25 to 25 mass %, and more preferably 0.5 to 10 mass %.

For concentration adjustment for diluting the polymerized product, the dispersion medium is preferably added two or more times, and the dispersion medium is preferably added after the polymerization step but before the dispersion treatment step and also added during the dispersion treatment step. By diluting the polymerized product in a stepwise manner by adding the dispersion medium in divided portions in this way, the dispersion treatment is efficiently carried out, and the conductivity of the obtained conjugated conductive polymer can be further improved.

[Conjugated Conductive Polymer]

The conjugated conductive polymer herein is an organic macromolecular compound having a π-conjugation in the main chain, and is not particularly limited as long as the conjugated conductive polymer is such a macromolecular compound. Examples of the conjugated conductive polymer include polypyrroles, polythiophenes, polyacethylenes, polyphenylenes, polyphenylene vinylenes, polyanilines, polyacenes, polythiophene vinylenes, copolymers thereof, and the like. Among these, polypyrroles, polythiophenes, and polyanilines are preferable, and polythiophenes are more preferable. It is preferable in view of obtaining high conductivity that the conjugated conductive polymer have a substituent such as an alkyl group, a carboxyl group, a sulfonic acid group, an alkoxyl group, a hydroxyl group, or a cyano group.

Specific examples of preferable conjugated conductive polymers include polypyrroles such as polypyrrole, poly(N-methyl pyrrole), poly(-methyl pyrrole), poly(-ethyl pyrrole), poly(-n-propyl pyrrole), poly(-butyl pyrrole), poly(-octyl pyrrole), poly(3-decyl pyrrole), poly(-dodecyl pyrrole), poly (3,4-dimethyl pyrrole), poly(3,4-dibutyl pyrrole), poly(-carboxy pyrrole), poly(-methyl-4-carboxy pyrrole), poly(3-methyl-4-carboxyethyl pyrrole), poly(3-methyl-4-carboxybutyl pyrrole), poly(-hydroxy pyrrole), poly(-methoxy pyrrole), poly(3-ethoxy pyrrole), poly(-butoxy pyrrole), poly(-hexyloxy pyrrole), and poly(-methyl-4-hexyloxy pyrrole); polythiophenes such as polythiophene, poly(3-methyl thiophene), poly(3-ethyl thiophene), poly(-propyl thiophene), poly(-butyl thiophene), poly(-hexyl thiophene), poly(-heptyl thiophene), poly(-octyl thiophene), poly(-decyl thiophene), poly(-dodecyl thiophene), poly(-octadecyl thiophene), poly(-bromothiophene), poly(-chlorothiophene), poly(-iodothiophene), poly(-cyanothiophene), poly(-phenyl thiophene), poly(3,4-dimethyl thiophene), poly(3,4-dibutyl thiophene), poly(-hydroxy thiophene), poly (-methoxy thiophene), poly(-ethoxy thiophene), poly(-butoxy thiophene), poly(-hexyl oxy thiophene), poly(-heptyloxy thiophene), poly(-octyloxy thiophene), poly(3-decyloxy thiophene), poly(-dodecyl oxy thiophene), poly(-octadecyloxy thiophene), poly(3,4-dihydroxy thiophene), poly(3,4-dimethoxy thiophene), poly(3,4-diethoxy thiophene), poly(3,4-dipropoxy thiophene), poly(3,4-dibutoxy thiophene), poly(3,4-dihexyloxy thiophene), poly(3,4-diheptyloxy thiophene), poly(3,4-dioctyloxy thiophene), poly (3,4-didecyloxy thiophene), poly(3,4-didodecyloxy thiophene), poly(3,4-ethylenedioxy thiophene) (PEDOT), poly (3,4-propylenedioxy thiophene), poly(3,4-butylenedioxy thiophene), poly(3-methyl-4-methoxy thiophene), poly(-methyl-4-ethoxy thiophene), poly(-carboxy thiophene), poly (-methyl-4-carboxy thiophene), poly(-methyl-4-carboxyethyl thiophene), poly(-methyl-4-carboxybutyl thiophene), and poly(3,4-ethyleneoxy thiathiophene); and polyanilines such as polyaniline, poly(2-methyl aniline), poly(-isobutyl aniline), poly(2-aniline sulfonate), poly(-aniline sulfonate), and the like. One of these may be used singly, and two or more may be used as a combination.

Among these, polypyrrole, polythiophene, poly(N-methyl pyrrole), poly(-methyl thiophene), poly(-methoxy thiophene), and PEDOT are preferable in view of high conductivity. PEDOT has high conductivity and, in addition, excellent heat resistance and is therefore particularly preferable.

The monomer that is to be a constitutional unit of the conjugated conductive polymer is not particularly limited as long as the monomer can be polymerized to form an organic macromolecular compound having a π-conjugation in the main chain. In particular, the monomer is preferably a constitutional unit of polypyrroles, polythiophenes, polyacethylenes, polyphenylenes, polyphenylene vinylenes, polyanilines, polyacenes, and polythiophene vinylenes. It is more preferable that the monomer include one or more selected from the group consisting of an optionally substituted pyrrole, an optionally substituted aniline, and an optionally substituted thiophene.

Examples of substituents include an alkyl group having 1 to 18 carbon atoms, an aryl group having 6 to 10 carbon atoms, a heteroaryl group having 5 to 10 carbon atoms, an alkoxy group having 1 to 18 carbon atoms, an alkylthio group having 1 to 18 carbon atoms, a carboxyl group, a hydroxyl group, a halogen atom, a cyano group, and the like. The alkyl group, the aryl group, the heteroaryl group, the alkoxy group, and the alkylthio group may be substituted with one or more selected from the group consisting of a carboxyl group, a hydroxyl group, a halogen atom, and a cyano group. Moreover, two or more substituents may be condensed to form a ring.

Specific examples of the monomer include pyrroles such as pyrrole, N-methyl pyrrole, 3-methyl pyrrole, 3-ethyl pyrrole, 3-n-propyl pyrrole, 3-butyl pyrrole, 3-octyl pyrrole, 3-decyl pyrrole, 3-dodecyl pyrrole, 3,4-dimethyl pyrrole, 3,4-dibutyl pyrrole, 3-carboxyl pyrrole, 3-methyl-4-carboxyl pyrrole, 3-methyl-4-carboxy ethyl pyrrole, 3-methyl-4-carboxy butyl pyrrole, 3-hydroxy pyrrole, 3-methoxy pyrrole, 3-ethoxy pyrrole, 3-butoxy pyrrole, 3-hexyl oxy pyrrole, 3-methyl-4-hexyl oxy pyrrole, and 3-methyl-4-hexyl oxy pyrrole; thiophenes such as thiophene, 3-methyl thiophene, 3-ethyl thiophene, 3-propyl thiophene, 3-butyl thiophene, 3-hexyl thiophene, 3-heptyl thiophene, 3-octyl thiophene, 3-decyl thiophene, 3-dodecyl thiophene, 3-octadecyl thiophene, 3-bromothiophene, 3-chlorothiophene, 3-iodothiophene, 3-cyanothiophene, 3-phenyl thiophene, 3,4-dimethyl thiophene, 3,4-dibutyl thiophene, 3-hydroxy thiophene, 3-methoxy thiophene, 3-ethoxy thiophene, 3-butoxy thiophene, 3-hexyloxy thiophene, 3-heptyloxy thiophene, 3-octyloxy thiophene, 3-decyloxy thiophene, 3-dodecyl oxy thiophene, 3-octadecyl oxy thiophene, 3,4-dihydroxy thiophene, 3,4-dimethoxy thiophene, 3,4-diethoxy thiophene, 3,4-dipropoxy thiophene, 3,4-dibutoxy thiophene, 3,4-dihexyloxy thiophene, 3,4-diheptyloxy thiophene, 3,4-dioctyloxy thiophene, 3,4-didecyloxy thiophene, 3,4-didodecyloxy thiophene, 3,4-ethylenedioxy thiophene, 3,4-propylenedioxy thiophene, 3,4-butylene dioxy thiophene, 3-methyl-4-methoxy thiophene, 3-methyl-4-ethoxy thiophene, 3-carboxy thiophene, 3-methyl-4-carboxy thiophene, 3-methyl-4-carboxyethyl thiophene, 3-methyl-4-carboxybutyl thiophene, and 3,4-ethyleneoxy thiathiophene; and anilines such as aniline, 2-methyl aniline, 3-isobutyl aniline, 2-aniline sulfonate, and 3-aniline sulfonate. One of these may be used singly, and two or more may be used as a combination, as long as the conjugated conductive polymer can be obtained by polymerization.

Among these, the monomer preferably contains a compound represented by formula (1) below:

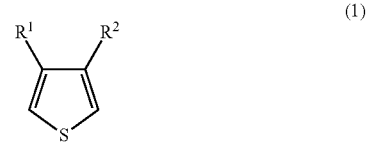

(1)

wherein $R^1$ and $R^2$ each independently represent any of a hydrogen atom, a hydroxyl group, an optionally substituted alkyl group having 1 to 18 carbon atoms, an optionally substituted alkoxy group having 1 to 18 carbon atoms, or an optionally substituted alkylthio group having 1 to 18 carbon atoms; or $R^1$ and $R^2$ are bonded to each other to form an optionally substituted alicyclic ring having 3 to 10 carbon atoms, an optionally substituted aromatic ring having 6 to 10 carbon atoms, an optionally substituted oxygen atom-containing heterocyclic ring having 2 to 10 carbon atoms, an optionally substituted sulfur atom-containing heterocyclic ring having 2 to 10 carbon atoms, or an optionally substituted sulfur atom and oxygen atom-containing heterocyclic ring having 2 to 10 carbon atoms. The number of carbon atoms does not include the number of carbon atoms of the substituent.

Specific examples of the oxygen atom-containing heterocyclic ring include an oxirane ring, an oxetane ring, a furan ring, a hydrofuran ring, a pyran ring, a pyrone ring, a dioxane ring, a trioxane ring, and the like.

Specific examples of the sulfur atom-containing heterocyclic ring include a thiirane ring, a thietane ring, a thiophene ring, a thiane ring, a thiopyrane ring, a thiopyrylium ring, a benzothiopyrane ring, a dithiane ring, a dithiolane ring, a trithiane ring, and the like.

Specific examples of the sulfur atom and oxygen atom-containing heterocyclic ring include an oxathiolane ring, an oxathiane ring, and the like.

The compound represented by formula (1) is more preferably a compound represented by formula (2) below:

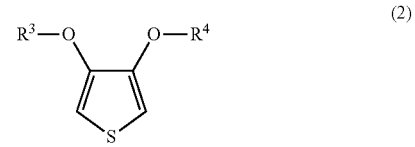

(2)

wherein $R^3$ and $R^4$ each independently represent any of a hydrogen atom, a hydroxyl group, and an optionally substituted alkyl group having 1 to 4 carbon atoms; or $R^3$ and $R^4$ are bonded to each other to form an optionally substituted oxygen atom-containing heterocyclic ring having 3 to 6 carbon atoms. The number of carbon atoms does not include the number of carbon atoms of the substituent.

It is preferable that $R^3$ and $R^4$ be bonded to each other to form an optionally substituted oxygen atom-containing heterocyclic ring having 3 to 6 carbon atoms. Examples of such an oxygen atom-containing heterocyclic ring include a dioxane ring, a trioxane ring, and the like, and a dioxane ring is more preferable.

Among the compounds represented by formula (2), 3,4-ethylenedioxy thiophene is particularly preferable.

Examples of the substituent concerning $R^1$ to $R^4$ in formula (1) and formula (2) include an alkyl group having 1 to 18 carbon atoms, an aryl group having 6 to 10 carbon atoms, a heteroaryl group having 5 to 10 carbon atoms, an alkoxy groups having 1 to 18 carbon atoms, an alkylthio group having 1 to 18 carbon atoms, a carboxyl group, a hydroxyl group, a halogen atom, a cyano group, and the like. The alkyl group, the aryl group, the heteroaryl group, the alkoxy group, and the alkylthio group may be substituted with one or more of a carboxyl group, a hydroxyl group, a halogen atom, and a cyano group. Two or more substituents may be condensed to form a ring.

[Polyanion]

The polyanion is a polymer having an anionic group and functions as a dopant for the conjugated conductive polymer. Examples of the anionic group include a group formed from a sulfonic acid or a salt thereof, a group formed from a phosphoric acid or a salt thereof, a monosubstituted phosphoric acid ester group, a group formed from a carboxylic acid or a salt thereof, a monosubstituted sulfuric acid ester group, and the like. Among these, a strongly acidic group is preferable, a group formed from a sulfonic acid or a salt thereof and a group formed from a phosphoric acid or a salt thereof are more preferable, and a group formed from a sulfonic acid or a salt thereof is further preferable.

The anionic group may be directly bonded to the main chain of a polymer, or may be bonded to a side chain. When the anionic group is bonded to a side chain, it is preferable that the anionic group be bonded to the terminal of the side chain because the doping effect is more significant.

The polyanion may have a substituent other than the anionic group. Examples of the substituent include an alkyl group, a hydroxy group, an alkoxy group, a phenol group, a cyano group, a phenyl group, a hydroxy phenyl group, an ester group, a halogeno group, an alkenyl group, an imide group, an amide group, an amino group, an oxy carbonyl group, a carbonyl group, and the like. Among these, the alkyl group, the hydroxy group, the cyano group, the hydroxy phenyl group, and the oxy carbonyl group are preferable, and the alkyl group, the hydroxy group, and the cyano group are more preferable. These substituents may be directly bonded to the main chain of the polyanion, or may be bonded to a side chain. When the substituent is bonded to a side chain, the substituent is preferably bonded to the terminal of the side chain in view of effective action of the substituent.

The alkyl group among the substituents acts to improve solubility and dispersibility in the dispersion medium, compatibility with and dispersibility in the conjugated conductive polymer, and the like. Specific examples of the alkyl group include chain alkyl groups such as a methyl group, an ethyl group, a propyl group, a butyl group, an isobutyl group, a t-butyl group, a pentyl group, a hexyl group, an octyl group, a decyl group, and a dodecyl group; and cycloalkyl groups such as a cyclopropyl group, a cyclopentyl group, and a cyclohexyl group. In consideration of solubility in the dispersion medium, dispersibility in the conjugated conductive polymer, steric hindrance, and the like, an alkyl group having 1 to 12 carbon atoms is more preferable.

The hydroxy group acts to facilitate formation of a hydrogen bond with another hydrogen atom or the like, and improve solubility in the dispersion medium and compatibility, dispersibility, adhesion, and the like with respect to the conjugated conductive polymer. The hydroxy group is preferably bonded to the terminal of an alkyl group having 1 to 6 carbon atoms bonded to the main chain of the polyanion.

The cyano group and the hydroxy phenyl group act to improve compatibility with the conjugated conductive polymer, solubility in the dispersion medium, heat resistance, and the like. The cyano group is preferably bonded at least either directly to the main chain of the polyanion or to the terminal of an alkyl group having 1 to 7 carbon atoms or an alkenyl group having 2 to 7 carbon atoms bonded to the main chain.

The oxy carbonyl group is preferably at least either an alkyl oxy carbonyl group or an aryl oxy carbonyl group, and is preferably bonded to the main chain of the polyanion directly or via another functional group.

The composition of the main chain of the polyanion is not particularly limited. Examples of the main chain of the polyanion include polyalkylene, polyimide, polyamide, polyester, and the like. Among these, polyalkylene is preferable in view of ease of synthesis and availability.

The polyalkylene is a polymer having an ethylenically unsaturated monomer as a constitutional unit, and may have a carbon-carbon double bond in the main chain. Specific examples of the polyalkylene include polyethylene, polypropylene, polybutene, polypentene, polyhexene, polyvinyl alcohol, polyvinyl phenol, poly(3,3,3-trifluoropropylene), polyacrylonitrile, polyacrylate, polymethacrylate, polystyrene, polybutadiene, polyisoprene, and the like.

Specific examples of the polyimide include polymers obtained by a polycondensation reaction between an acid anhydride such as pyromellitic acid dianhydride, biphenyl tetracarboxylic acid dianhydride, benzophenone tetracarboxylic acid dianhydride, 2,2,3,3-tetracarboxy diphenyl ether dianhydride, or 2,2-[4,4'-di(dicarboxy phenyl oxy) phenyl]propane dianhydride, and a diamine such as oxy dianiline, paraphenylene diamine, methaphenylene diamine, or benzophenone diamine.

Specific examples of the polyamide include Nylon 6, Nylon 66, Nylon 610, and the like.

Specific examples of the polyester include polyethylene terephthalate, polybutylene terephthalate, and the like.

Specific examples of the polymer having a sulfonic acid group preferable as the polyanion include polyvinyl sulfonic acid, polystyrene sulfonic acid (PSS), polyallyl sulfonic acid, polyacrylic ethyl sulfonic acid, polyacrylic butyl sulfonic acid, poly(2-acrylamide-2-methyl propane sulfonic acid), polyisoprene sulfonic acid, alkali metal salts thereof, and the like. One of these may be used singly, and two or more may be used as a combination. Among these, PSS, polyisoprene sulfonic acid, polyacrylic ethyl sulfonic acid, polyacrylic butyl sulfonic acid, sodium salts or potassium salts thereof, and the like are preferable in view of imparting conductivity, and PSS and sodium polystyrene sulfonate are more preferable.

Among the polyanions, polymers having a sulfonic acid group in particular have excellent action to alleviate thermal decomposition of the conjugated conductive polymer and, also, can improve dispersibility of the monomer that is to be a constitutional unit of the conjugated conductive polymer in the dispersion medium.

The weight-average molecular weight of the polyanion is preferably 1,000 to 1,000,000, more preferably 3,000 to 600,000, and further preferably 5,000 to 300,000. When the weight-average molecular weight is within the above range, the solubility in the dispersion medium and the compatibility with the conjugated conductive polymer of the polyanion are excellent. The weight-average molecular weight herein is a value measured as a molecular weight in terms of polystyrene sulfonic acid by using gel permeation chromatography.

A commercially available polyanion or alternatively a polyanion synthesized by a known method can be used. Examples of the method for synthesizing a polyanion include methods described in PTL 1 to PTL 3, and the like.

[Dispersion Medium]

The dispersion medium used in the present invention is not particularly limited as long as the monomer that is to be a constitutional unit of the conjugated conductive polymer, the polyanion, and the polymerized product can be dispersed therein.

Specific examples of the dispersion medium include water; amides such as N-vinyl pyrrolidone, hexamethyl phosphortriamide, N-vinyl formamide, and N-vinyl acetamide; phenols such as cresol, phenol, and xylenol; polyhydric alcohols such as dipropylene glycol, 1,3-butylene glycol, 1,4-butylene glycol, diglycerin, isoprene glycol, butanediol, 1,5-pentanediol, 1,6-hexanediol, 1,9-nonanediol, and neopentyl glycol; carbonates such as ethylene carbonate and propylene carbonate; ethers such as dioxane, diethyl ether, propylene glycol dialkyl ether, polyethylene glycol dialkyl ether, and polypropylene glycol dialkyl ether; heterocyclic compounds such as 3-methyl-2-oxazolidinone; nitriles such as acetonitrile, glutarodinitrile, methoxy acetonitrile, propionitrile, and benzonitrile; and the like. One of these may be used singly, and two or more may be used as a combination.

The dispersion medium may contain an aqueous medium for use in the production of seed particles that are converted into colloid protected by the polyanion, which will be described below.

Among these, it is preferable that the dispersion medium contain water. The water content in this case is preferably 1 mass % or more, more preferably 50 mass % or more, and further preferably 100 mass %, i.e., the dispersion medium preferably consists solely of water.

Although the dispersion medium used in the polymerization step and the dispersion medium used in the dispersion treatment step are not necessarily the same, it is preferable in view of ease of operation, prevention of a sudden change in dispersibility, and the like to use dispersion media having the same composition.

[Seed Particles that have been Converted into Colloid Protected by Polyanion]

The dispersion medium containing the polyanion may contain seed particles that have been converted into colloid protected by the polyanion (hereinafter sometimes simply referred to as seed particles). The seed particles that have been converted into colloid protected by the polyanion refer to colloid in which seed particles are protected by the polyanion. Due to such seed particles being contained in the dispersion medium in the polymerization step, the polymerization reaction is promoted, and, also, the dispersibility of the conjugated conductive polymer can be improved. The particle diameter of the obtained polymerized product can be controlled as well.

As for the particle diameter of the seed particles dispersed in the dispersion medium, d50 (50% median diameter on a volume basis) is preferably 0.005 to 10 μm, and more preferably 0.02 to 1 μm. d50 herein can be determined from a particle diameter distribution measured using a dynamic light scattering Microtrack UPA-type particle size distribution measurement device (manufactured by Nikkiso Co., Ltd.).

The seed particles are converted into colloid protected by the polyanion in the dispersion medium. The seed particles are preferably, for example, particles of a polymer or a copolymer obtained by polymerizing an ethylenically unsaturated monomer, or the like.

The ethylenically unsaturated monomer may be an ethylenically unsaturated monomer having one or more polymerizable vinyl groups, and examples include (meth)acrylic esters having a linear, branched, or cyclic alkyl group, aromatic vinyl compounds such as styrene and α-methyl styrene; heterocyclic vinyl compounds such as vinyl pyrrolidone; hydroxy alkyl (meth)acrylates; dialkyl aminoalkyl (meth)acrylates; vinyl esters such as vinyl acetate and vinyl alkanate; monoolefins such as ethylene, propylene, butylene, and isobutylene; conjugated diolefins such as butadiene, isoprene, and chloroprene; α,β-unsaturated mono or dicarboxylic acids such as (meth)acrylic acid, crotonic acid, itaconic acid, maleic acid, and fumaric acid; vinyl cyanide compounds such as acrylonitrile; carbonyl group-containing vinyl compounds such as acrolein and diacetone acrylamide; and the like. One of these may be used singly, and two or more may be used as a combination. In the present specification, (meth)acrylate refers to acrylate or methacrylate.

Among these, the ethylenically unsaturated monomer preferably contains an aromatic vinyl compound, and more preferably contains styrene. In this case, the aromatic vinyl compound is preferably contained in an amount of 50 to 100 mass %, more preferably 60 to 100 mass %, and further preferably 70 to 100 mass % of the ethylenically unsaturated monomer.

Into the copolymer obtained from the ethylenically unsaturated monomer, as necessary, a crosslinkable monomer, e.g., an epoxy group-containing α,β-ethylenically unsaturated compound such as glycidyl (meth)acrylate; a hydrolyzable alkoxysilyl group-containing α,β-ethylenically unsaturated compound such as vinytriethoxysilane or γ-methacryloxypropyltrimethoxysilane; or a polyfunctional-vinyl compound such as ethylene glycol di(meth)acrylate, trimethylolpropane tri(meth)acrylate, allyl (meth)acrylate, divinylbenzene, or diallylphthalate, may be introduced, and such a copolymer may be cross-linked by the monomers or cross-linked in combination with an ethylenically unsaturated compound having an active hydrogen group. Also, a crosslinkable monomer such as a carbonyl group-containing α,β-ethylenically unsaturated compound (having a ketone group) may be introduced into the copolymer, followed by cross-linking such a copolymer in combination with a polyhydrazine compound (in particular, a compound having two or more hydrazide groups, such as oxalic acid dihydrazide, succinic acid dihydrazide, adipic acid dihydrazide, or polyacrylic acid hydrazide).

Thus, by forming a cross-linked copolymer, the water resistance, moisture resistance, heat resistance, and the like of the conjugated conductive polymer can be improved.

(Method for Producing Seed Particles that have been Converted into Colloid Protected by Polyanion)

The seed particles that have been converted into colloid protected by the polyanion can be obtained as a resin emulsion that is in a state where particles are dispersed in a dispersion medium. Specifically, the seed particles that have been converted into colloid protected by the polyanion can be produced as follows.

The seed particles that have been converted into colloid protected by the polyanion can be obtained through a radical polymerization reaction by any of the batch-type, semicontinuous, and continuous methods using a normal pressure reactor or a pressure tight reactor. It is preferable in view of reaction stability and uniformity during polymerization to perform the polymerization by dissolving, emulsifying, or dispersing the ethylenically unsaturated monomer and the polyanion in respective dispersion media in advance and continuously or intermittently adding the ethylenically unsaturated monomer-containing solution to the polyanion-containing solution. The reaction temperature is usually 10 to 100° C., more preferably 20 to 95° C., and further preferably 30 to 90° C. The reaction time is not particularly limited, and is suitably adjusted according to the amount of each reaction component used, the type of a polymerization initiator, the reaction temperature, and the like.

An aqueous medium is used as the dispersion medium, and water or a mixed solvent of water and a water soluble solvent is suitably used. In the case of a mixed solvent, the water content is preferably 70 mass % or more in view of the stability of the resin emulsion.

Specific examples of the water soluble solvent include alcohols such as methanol, ethanol, and isopropyl alcohol; ketones such as acetone; glycols such as ethylene glycol and propylene glycol; ethers such as ethylene glycol monomethyl ether and ethylene glycol monobutyl ether; and the like.

A known polymerization initiator can be used in the radical polymerization reaction. Specific examples of the polymerization initiator include inorganic peroxides such as hydrogen peroxide, persulfate, ammonium persulfate, potassium persulfate, and sodium persulfate; organic peroxides such as benzoyl peroxide and t-butyl hydroperoxide; azo compounds such as 2,2'-azobisisobutyronitrile and 4,4'-azobis(4-cyanovaleric acid); and the like.

As necessary, these polymerization initiators may be combined with sodium formaldehyde sulfoxylate, ascorbic acid, sulfites, tartaric acid or salts thereof, iron (II) sulfate, and the like for redox polymerization. As necessary, chain transfer agents such as alcohols and mercaptans may be used.

While the polyanion that converts the seed particles into protected colloid contributes to the stability of the seed particles that are emulsion particles during the polymerization reaction, an emulsifying agent such as an anionic, nonionic, or reactive emulsifying agent, an aliphatic amine, or the like may be added to the reaction system as necessary. The types and the amounts of the emulsifying agent, the aliphatic amine, and the like used are suitably adjusted according to various conditions such as the amount of the polyanion used and the composition of the ethylenically unsaturated monomer.

Examples of preferable emulsifying agents include anionic emulsifying agents such as an alkyl sulfuric acid ester salt, an alkyl benzene sulfonic acid salt, an alkyl sulfosuccinic acid salt, an alkyl diphenyl ether disulfonic acid salt, a polyoxy alkylene alkyl sulfuric acid salt, and a polyoxy alkylene alkyl phosphoric acid ester; and nonionic surfactants such as polyoxy alkylene alkyl ether, polyoxy alkylene alkyl phenol ether, polyoxy alkylene fatty acid ester, and polyoxy alkylene sorbitan fatty acid ester.

Specific examples of aliphatic amines include primary amines such as octyl amine, lauryl amine, myristyl amine, stearyl amine, and oleyl amine; secondary amines such as dioctyl amine, dilauryl amine, distearyl amine, and dioleyl amine; tertiary amine such as N,N-dimethyl lauryl amine, N,N-dimethyl myristyl amine, N,N-dimethyl palmityl amine, N,N-dimethyl stearyl amine, N,N-dimethyl behenyl amine, N,N-dimethyl oleyl amine, N-methyl didecyl amine, and N-methyl dioleyl amine; and the like. As for the emulsifying agents and the aliphatic amines, one may be used singly, and two or more may be used as a combination.

A water soluble polymer such as polyvinyl alcohol, methyl cellulose, carboxy methyl cellulose, hydroxy ethyl cellulose, hydroxy propyl cellulose, or polyvinyl pyrrolidone may be used in combination as long as the properties of the obtained conjugated conductive polymer are not impaired.

The content of the ethylenically unsaturated monomer in the seed particles is preferably 10 to 100 parts by mass, more preferably 20 to 90 parts by mass, and further preferably 10 to 60 parts by mass based on 100 parts by mass of the polyanion that converts the seed particles into protected colloid. With the content being within the above range, the seed particles are sufficiently stable in the dispersion medium, and the viscosity increase suppressing effect can be sufficiently exerted by the seed particles in the polymerization step for the conjugated conductive polymer.

[Polymerization Step]

In the method for producing the conductive polymer-containing dispersion of the present invention, first, the monomer that is to be a constitutional unit of the conjugated conductive polymer is subjected to a polymerization reaction in a mixed solution containing the monomer, the polyanion, and the dispersion medium to produce a polymerized product. That is to say, the polymerization reaction is carried out in a mixed solution containing the polyanion. As described above, the mixed solution may contain seed particles that have been converted into colloid protected by the polyanion.

(Addition of Polyanion)

The polyanion can be contained in the mixed solution by adding the polyanion to a monomer-dispersed dispersion medium and dissolving, emulsifying, or dispersing the polyanion therein.

In view of improving the dispersibility of the monomer and the polymerized product in the dispersion medium and suppressing an increase of the viscosity of the dispersion, the polyanion or the seed particles that have been converted into colloid protected by the polyanion may be further added during the course of the polymerization step. Either the polyanion or the seed particles, or both may be added. By further adding these, an increase of the viscosity of the reaction solution during polymerization is suppressed and also conversion of the seed particles into protected colloid is promoted, thereby to improve stirring and mixing efficiency and reduce a burden on the manufacturing device.

When the polyanion is further added, the amount thereof is preferably 5 to 90 mass % and more preferably 20 to 70 mass % of the total amount of the polyanion used.

When the seed particles that have been converted into colloid protected by the polyanion are further added, the amount thereof is preferably 10 to 90 mass % and more preferably 20 to 70 mass % of the total amount of the seed particles that have been converted into protected colloid used. The seed particles that have been converted into colloid protected by the polyanion are preferably added as an emulsion (a dispersion) in view of dispersibility during addition.

The total amount of the polyanion used in the production method of the present invention, including the polyanion that converts the seed particles into protected colloid, is an amount such that the anionic group in the polyanion is preferably 0.25 to 30 mol and more preferably 0.8 to 25 mol per 1 mol of the monomer that is to be a constitutional unit of the conjugated conductive polymer. With the amount of the polyanion used being within the above range, a conjugated conductive polymer that has sufficient conductivity and dispersibility in the dispersion medium can be obtained.

The amount of the polyanion used, excluding the polyanion that converts the seed particles into protected colloid, is preferably 5 to 99 mass %, more preferably 10 to 90 mass %, and further preferably 20 to 80 mass % of the total amount of the polyanion used including the polyanion that converts the seed particles into protected colloid.

The total amount of the polyanion used based on 100 parts by mass of the conjugated conductive polymer to be obtained is preferably 10 to 30,000 parts by mass and more preferably 50 to 25,000 parts by mass.

(Dispersion of Monomer)

In the production method of the present invention, the monomer may be dispersed in the dispersion medium in the polymerization step or, alternatively, the polymerization step may be carried out after a monomer dispersion preparation step. That is to say, in the monomer dispersion preparation step, the monomer and the polyanion may be added to the dispersion medium in advance to prepare a dispersion of the monomer, and this monomer dispersion may be subjected to the polymerization step. It is preferable that the monomer dispersion contain the seed particles that have been converted into colloid protected by the polyanion.

It is preferable that dispersion in the monomer dispersion preparation step be carried out efficiently and uniformly. From such a viewpoint, while it is possible to use a powerful stirrer such as a homogenizer, it is preferable to use ultrasonic irradiation. The amount of ultrasonic irradiation energy is not particularly limited as long as a uniform monomer dispersion can be obtained, and, for example, when the frequency of ultrasonic waves is 15 to 50 kHz, ultrasonic irradiation is preferably carried out at a power consumption of 5 to 500 W/L for an irradiation time of 0.1 to 2 hours/L.

In view of imparting an appropriate viscosity to the monomer dispersion and causing the polymerization reaction to proceed at a uniform and appropriate rate, the amount of the dispersion medium at the time of polymerization is preferably 1 to 50,000 parts by mass and more preferably 50 to 10,000 parts by mass based on 100 parts by mass of the total amount of the monomer that is to be a constitutional unit of the conjugated conductive polymer, the polyanion, and the seed particles that have been converted into colloid protected by the polyanion.

(Oxidizing Agent)

It is preferable that polymerization be carried out using one or more oxidizing agents selected from the group consisting of peroxodisulfuric acid and a salt thereof. The oxidizing agent serves as a polymerization initiator.

Examples of the oxidizing agent include peroxodisulfuric acid; peroxodisulfuric acid salts such as ammonium peroxodisulfate, sodium peroxodisulfate, and potassium peroxodisulfate; metal halogen compounds such as boron trifluoride; transition metal compounds such as iron (III) chloride, iron (III) sulfate, and copper (II) chloride; metal oxides such as silver oxide and cesium oxide; peroxides such as hydrogen peroxide and ozone; organic peroxides such as benzoyl peroxide; oxygen; and the like. One of the oxidizing agents may be used singly, and two or more may be used as a combination.

Among these, peroxodisulfuric acid and peroxodisulfuric acid salts are preferable, and peroxodisulfuric acid salts are more preferable.

(Polymerization Temperature and Time)

The temperature at the time of polymerization is usually 5 to 80° C., preferably 10 to 60° C., and more preferably 15 to 40° C. When the temperature is within the above range, an increase of viscosity during polymerization is suppressed, the polymerization reaction progresses at an appropriate reaction rate, polymerization can be carried out stably and efficiently, and the conductivity of the obtained conjugated conductive polymer is improved.

The temperature may be controlled by using a known heater or cooler and, as necessary, the temperature may be varied within the above range during polymerization.

The polymerization time is not particularly limited, and is suitably adjusted according to the type and the amount of each polymerization component used, the reaction temperature, and the like.

(Additive)

In the polymerization step, other additives may be added to the mixed solution as necessary, as long as such additives neither interfere with the polymerization reaction nor impair the effects of the present invention. Such additives may be added to the dispersion treatment step after the polymerization step as necessary, as long as the effects of the present invention are not impaired.

Examples of additives include water soluble macromolecular compounds, water dispersible compounds, alkaline compounds, surfactants, antifoaming agents, coupling agents, antioxidizing agents, conductivity improvers, and the like. One of these additives may be used singly, and two or more may be used as a combination. Also, one member of each kind of additives may be used singly, or two or more members may be used as a combination.

<Water Soluble Macromolecular Compound and Water Dispersible Compound>

The water soluble macromolecular compound and the water dispersible compound act to adjust the viscosity of the conductive polymer-containing dispersion, improve coatability, and the like.

The water soluble macromolecular compound is a water soluble polymer having a cationic group or a nonionic group on the main chain or a side chain. Specific examples of the water soluble macromolecular compound include polyoxy alkylene, water soluble polyurethane, water soluble polyester, water soluble polyamide, water soluble polyimide, water soluble polyacryl, water soluble polyacrylamide, polyvinyl alcohol, polyacrylic acid, and the like. Among these, polyoxy alkylene is preferable.

Specific examples of polyoxy alkylene include oligopolyethylene glycol, triethylene glycol monochlorohydrin, diethylene glycol monochlorohydrin, oligoethylene glycol monochlorohydrin, triethylene glycol monobromohydrin, diethylene glycol monobromohydrin, oligoethylene glycol monobromohydrin, polyethylene glycol, glycidyl ethers, polyethylene glycol glycidyl ethers, polyethylene oxide, triethylene glycol dimethyl ether, tetraethylene glycol dimethyl ether, diethylene glycol dimethyl ether, diethylene glycol diethyl ether diethylene glycol dibutyl ether, dipropylene glycol, tripropylene glycol, polypropylene glycol, polypropylene dioxide, polyoxy ethylene alkyl ether, polyoxy ethylene glycerin fatty acid ester, polyoxy ethylene fatty acid amide, and the like.

The water dispersible compound is a water dispersible compound in which a part of a low-hydrophilicity compound is replaced with a high-hydrophilicity functional group, or a water dispersible compound in which a compound having a high-hydrophilicity functional group is adsorbed around a low-hydrophilicity compound (such as an emulsion), and examples include water dispersible compounds that are dispersed in water without being precipitated. Specific examples of the water dispersible compound include polyester, polyurethane, an acrylic resin, a silicone resin, resin emulsions of these resins, and the like.

The total amount of the water soluble compound and the water dispersible compound is preferably 1 to 4000 parts by mass, more preferably 20 to 2000 parts by mass, and further preferably 50 to 500 parts by mass based on 100 parts by mass of the total amount of the monomer that is to be a constitutional unit of the conjugated conductive polymer, the polyanion, and the seed particles that have been converted into colloid protected by the polyanion.

<Alkaline Compound>

The alkaline compound acts to impart corrosion resistance to articles to which the conductive polymer-containing dispersion is applied and, also, adjust the pH of the conductive polymer-containing dispersion. For example, when the conductive polymer-containing dispersion is applied to the production of solid electrolytes for electrolytic capacitors, the pH is preferably regulated to 3 to 13 and more preferably 4 to 7 in view of preventing the corrosion of metals, metal oxides, and the like used in electrolytic capacitors and preventing the dedoping of the polyanion that is a dopant for the conductive polymer.

As the alkaline compound, a known inorganic or organic alkaline compound can be used. Specific examples of the inorganic alkaline compound include ammonia, sodium hydroxide, potassium hydroxide, calcium hydroxide, ammonia, and the like. Examples of the organic alkaline compound include aromatic amines, aliphatic amines, alkali metal alkoxides, and the like.

Among the aromatic amines, nitrogen-containing heteroaryl ring compounds such as pyridines, imidazoles, pyrimidines, pyrazines, and triazines are preferable. Among these, pyridines, imidazoles, and pyrimidines are more preferable in view of solvent solubility and the like.

Specific examples of the aliphatic amines include ethyl amine, n-octyl amine, diethyl amine, diisobutyl amine, methylethyl amine, trimethyl amine, triethyl amine, allyl amine, 2-ethyl aminoethanol, 2,2'-iminodiethanol, N-ethyl ethylene diamine, and the like.

Examples of the alkali metal alkoxides include sodium alkoxides such as sodium methoxide and sodium ethoxide, potassium alkoxides, calcium alkoxides, and the like.

<Surfactants>

Examples of the surfactants include anionic surfactants such as a carboxylic acid salt, a sulfonic acid salt, a sulfuric acid ester salt, and a phosphoric acid ester salt; cationic surfactants such as an amine salt and a quaternary ammonium salt; amphoteric surfactants such as carboxy betaine, an aminocarboxylic acid salt, and imidazolium betaine; nonionic surfactants such as polyoxyethylene alkyl ether, polyoxyethylene glycerin fatty acid ester, ethylene glycol fatty acid ester, and polyoxyethylene fatty acid amide; and the like.

<Antifoaming Agents and Antioxidizing Agents>

Examples of antifoaming agents include a silicone resin, polydimethyl siloxane, a silicone resin, and the like.

Examples of antioxidizing agents include a phenol-based antioxidizing agent, an amine-based antioxidizing agent, a phosphorus-based antioxidizing agent, a sulfur-based antioxidizing agent, sugars, vitamins, and the like.

<Conductivity Improvers>

Examples of conductivity improvers include compounds having an ether bond, such as tetrahydrofurane; compounds having a lactone group, such as γ-butyrolactone and γ-valerolactone; compounds having an amide group or a lactam group, such as caprolactam, N-methyl caprolactam, N,N-dimethyl acetamide, N-methyl acetamide, N,N-dimethyl formamide, N-methyl formamide, N-methyl formanilide, N-methyl pyrrolidone, N-octyl pyrrolidone, and pyrrolidone; sulfone compounds or sulfoxide compounds such as tetramethylene sulfone and dimethyl sulfoxide; sugars or derivatives thereof such as sucrose, glucose, fructose, and lactose; sugar alcohols such as sorbitol and mannitol; imides such as succinimide and maleimide; furane derivatives such as 2-furane carboxylic acid and 3-furane carboxylic acid; dialcohols or polyalcohols such as ethylene glycol, propylene glycol, glycerin, diethylene glycol, and triethylene glycol; and the like. Among these, tetrahydrofurane, N-methyl formamide, N-methyl pyrrolidone, ethylene glycol, propylene glycol, glycerin, dimethyl sulfoxide, and sorbitol are preferable, and ethylene glycol, propylene glycol, and glycerin are more preferable in view of improving conductivity.

(Dispersion of Polymerized Product)

During the polymerization step, it is preferable to uniformly disperse the produced polymerized product in the reaction solution. In view of efficiently and uniformly dispersing the produced polymerized product, while it is possible to use a powerful stirrer such as a homogenizer, it is preferable to use a high shear mixer such as an in-line disperser/pulverizer or a continuous high-efficiency emulsifier/disperser, or ultrasonic irradiation, and it is more preferable to carry out ultrasonic treatment.

A high shear mixer can perform dispersion treatment by rapidly rotating a rotor that faces a stator to give a high shear rate to a treatment solution that passes through narrow space. The rate of shear given to the reaction solution is not particularly limited as long as aggregation of the polymerized product is suppressed, and is preferably 5000/s or more, more preferably 10000/s or more, and further preferably 25000/s or more in view of effectively suppressing aggregation.

Ultrasonic irradiation can effectively suppress aggregation of the polymerized product even when a conjugated conductive polymer having a long main chain is obtained. The amount of ultrasonic irradiation energy is not particularly limited as long as aggregation of the polymerized product is suppressed and, for example, when the frequency of ultrasonic waves is 15 to 50 kHz, ultrasonic irradiation is preferably carried out at a power consumption of 5 to 600 W/L for an irradiation time of 0.1 to 10 hours/L.

Dispersion of the polymerized product by such ultrasonic irradiation may be carried out in the dispersion treatment step after the polymerization step. Also, it may be carried out in both the polymerization step and the dispersion treatment step.

[Dispersion Treatment Step]

In the dispersion treatment step, the reaction solution obtained in the polymerization step is subjected to a dispersion treatment to prepare a dispersion of the polymerized product, i.e., a conductive polymer-containing dispersion.

After the dispersion treatment step, it is preferable to carry out a post-treatment step of removing substances other than the conductive polymer, such as the unreacted monomer and the oxidizing agent remaining in the dispersion. The method for removing such substances is not particularly limited, and an example is a method involving causing such substances to be adsorbed onto a cation exchange resin and an anion exchange resin for selective removal.

According to, for example, the mode of using the conductive polymer-containing dispersion, the above-described additives may be suitably added for pH adjustment or the like.

(Conductivity Polymer-Containing Dispersion)

The conductive polymer in the conductive polymer-containing dispersion obtained by the present invention is obtained as a particulate polymer in which the conjugated conductive polymer is doped with the polyanion; or as a particulate polymer in which the conjugated conductive polymer is doped with the polyanion on the surface of the seed particles, the polyanion being coordinated with the surface of the seed particles so as to form protected colloid. By doping the conjugated conductive polymer with the polyanion, high conductivity is exerted. Also, a transparent conductive polymer can be obtained.

A film, a shaped article having a predetermined shape, or the like of the conductive polymer can be obtained by applying the conductive polymer-containing dispersion obtained by the production method of the present invention to an article by means of coating, spraying, dipping, or the like, and then removing dispersion medium. Accordingly, functions of the conductive polymer, such as conductivity, can be imparted to articles.

The dispersion medium can be removed by a known technique such as room temperature drying, heated air drying, or far infrared ray irradiation drying.

EXAMPLES

The present invention will now be described more specifically by way of examples below, but the present invention is not limited to the examples.

[Physical Property Measurement]

The methods for measuring various physical properties in the following examples and comparative examples are as follows. The measurement results thereof are shown in Table 1 below.

(1) pH

The pH of the obtained conductive polymer-containing dispersion was measured at 25° C. with a pH meter (manufactured by DKK-TOA Corporation, HM-30G).

(2) Viscosity

The viscosity of the obtained conductive polymer-containing dispersion was measured under conditions having 23° C. and a sheer rate of 100/s with a rheometer (manufactured by HAAKE, RheoStress 6000) using a C35/1° Ti L rotor.

(3) Surface Resistance

In accordance with JIS K 7194:1944, the obtained conductive polymer-containing dispersion was flow-casted onto a glass plate and dried by heated air at 100° C., and thus a film having a thickness of 10 μm was formed. Using this as a measurement sample, the surface resistance was measured with a low resistivity meter (manufactured by Mitsubishi Chemical Analytech Co., Ltd., Loresta GP) using a PSP probe.

[Production of Seed Particles that have been Converted into Colloid Protected by Polyanion]

1000 g of a 22 mass % aqueous solution of sodium polystyrene sulfonate (manufactured by Tosoh Organic Chemical Co., Ltd., a trade name: Polinas PS-5, a weight-average molecular weight: approximately 120,000, the same applies below) was heated to 80° C. while being stirred in a nitrogen atmosphere. After 2 g of potassium persulfate was added to the solution, an emulsified mixture of 135 g of styrene, 15 g of divinyl benzene, and 500 g of a 22 mass % aqueous solution of sodium polystyrene sulfonate, and 40 g of a 2.5 mass % aqueous solution of potassium persulfate were added dropwise over 2 hours and 2.5 hours, respectively. After dropwise addition, the mixture was maintained at 80° C. for 2 hours and then cooled to room temperature. 1500 ml of a cation exchange resin and 1500 ml of an anion exchange resin were added to the obtained reaction solution. The mixture was stirred for 12 hours, and then the ion exchange resins were filtered off to obtain a dispersion (a polystyrene emulsion) of seed particles that have been converted into colloid protected by the polyanion. The particle diameter d50 of the seed particles (polystyrene) in the obtained polystyrene emulsion was 0.46 μm.

As for the particle diameter of the seed particles, d50 was determined from the particle diameter distribution measured by Microtrack UPA-type particle size distribution measurement device (manufactured by Nikkiso Co., Ltd.).

Example 1

(Monomer Dispersion Preparation Step)

In a 3 L glass cylindrical flat-bottom separable flask, 2024 g of ion exchanged water (hereinafter simply referred to as water), 350 g of a 12 mass % aqueous solution of sodium polystyrene sulfonate as a polyanion, and 452 g of the polystyrene emulsion (a nonvolatile content of 15 mass %) produced above as seed particles that have been converted into colloid protected by the polyanion were mixed by being stirred at 27° C. 35.0 g of 3,4-ethylenedioxy thiophene as a monomer that is to be a constitutional unit of a conjugated conductive polymer was added to the solution while giving ultrasonic irradiation at 27° C. (20 kHz, a power consumption of 500 W, an irradiation time of 5 hours) to prepare a monomer dispersion. The total amount of sodium polystyrene sulfonate used was 1.7 mol in terms of sulfonic acid group per 1 mol of 3,4-ethylenedioxy thiophene (the same applies to the following examples and comparative examples).

(Polymerization Step)

The obtained monomer dispersion was introduced into a 5 L stainless-steel vessel equipped with a high shear mixer and a circulation pump, and stirred with a stirring blade and a high shear mixer at 27° C., 73.6 g of sodium peroxothsulfate and 86.0 g of a 1 mass % aqueous solution of iron (III) sulfate hexahydrate were added as oxidizing agents, and a polymerization reaction was carried out for 6 hours.

From the reaction vessel, 604 g of the obtained reaction solution was removed and, in turn, the same amount of water (604 g) as a dispersion medium was added to the reaction vessel.

(Dispersion Treatment Step)

The above water-added reaction solution was transferred to a 5 L stainless-steel vessel equipped with an ultrasonicator and a circulation pump, and subjected to a dispersion treatment by ultrasonic irradiation (20 kHz, a power consumption of 560 W, an irradiation time of 3 hours) at 32° C.

(Post-Treatment Step)

300 mL of a cation exchange resin (manufactured by Organo Corporation, IR120B-H) and 300 mL of an anion exchange resin (manufactured by Organo Corporation, IRA410-OH) were added to 300 g of the dispersion of the polymerized product obtained in the dispersion treatment step, the mixture was stirred for 6 hours, and then the ion exchange resins were filtered off to thereby remove the unreacted monomer and the oxidizing agents. Thereafter, the pH of the dispersion of the polymerized product was regulated to 4.4 by aqueous ammonia, and a conductive polymer-containing dispersion was thus obtained.

Example 2

(Monomer Dispersion Preparation Step and Polymerization Step)

A monomer dispersion was prepared and then a polymerization reaction was carried out in the same manner as in Example 1 except that the amounts of raw materials blended were as shown in Table 1 below.

(Dispersion Treatment Step)

The obtained reaction solution was transferred to a 5 L stainless-steel vessel equipped with an ultrasonicator and a circulation pump, and a dispersion treatment by ultrasonic irradiation (20 kHz, a power consumption of 560 W, an irradiation time of 3 hours) at 32° C. was initiated. After a time course of 1.5 hours from the beginning of the dispersion treatment (a time course of 50% of the irradiation time), 699 g of the dispersion was removed from the dispersion treatment vessel and, in turn, the same amount of water (699 g of water) as a dispersion medium was added to the dispersion treatment vessel.

(Post-Treatment Step)

Post-treatment step was carried out in the same manner as in Example 1 to obtain a conductive polymer-containing dispersion having a pH of 4.5.

Example 3

(Monomer Dispersion Preparation Step and Polymerization Step)

A monomer dispersion was prepared and a polymerization reaction was carried out in the same manner as in Example 1.

604 g of the obtained reaction solution was removed from the reaction vessel and, in turn, the same amount of water (604 g) as a dispersion medium was added to the reaction vessel.

(Dispersion Treatment Step)

The above water-added reaction solution was transferred to a 5 L stainless-steel vessel equipped with an ultrasonicator and a circulation pump, and a dispersion treatment by ultrasonic irradiation (20 kHz, a power consumption of 560 W, an irradiation time of 3 hours) at 32° C. was initiated. After a time course of 1.5 hours from the beginning of the dispersion treatment (a time course of 50% of the irradiation time), 696 g of the dispersion was removed and, in turn, the same amount of water (696 g of water) as a dispersion medium was added to the dispersion treatment vessel.

(Post-Treatment Step)

Post-treatment step was carried out in the same manner as in Example 1 to obtain a conductive polymer-containing dispersion having a pH of 4.6.

Example 4

(Monomer Dispersion Preparation Step and Polymerization Step)

A monomer dispersion was prepared and a polymerization reaction was carried out in the same manner as in Example 1 except that the amounts of raw materials blended were as shown in Table 1 below.

1029 g of the obtained reaction solution was removed from the reaction vessel and, in turn, the same amount of water (1029 g) as a dispersion medium was added to the reaction vessel.

(Dispersion Treatment Step)

The above water-added reaction solution was transferred to a 5 L stainless-steel vessel equipped with an ultrasonicator and a circulation pump, and a dispersion treatment by ultrasonic irradiation (20 kHz, a power consumption of 560 W, an irradiation time of 3 hours) at 32° C. was initiated. After a time course of 1.5 hours from the beginning of the dispersion treatment (a time course of 50% of the irradiation time), 698 g of the dispersion was removed and, in turn, the same amount of water (698 g of water) as a dispersion medium was added to the dispersion treatment vessel.

(Post-Treatment Step)

Post-treatment step was carried out in the same manner as in Example 1 to obtain a conductive polymer-containing dispersion having a pH of 4.4.

Comparative Example 1

(Monomer Dispersion Preparation Step and Polymerization Step)

A monomer dispersion was prepared and a polymerization reaction was carried out in the same manner as in Example 1 except that the amounts of raw materials blended were as shown in Table 1 below.

(Dispersion Treatment Step)

The obtained reaction solution was transferred to a 5 L stainless-steel vessel equipped with an ultrasonicator and a circulation pump, and a dispersion treatment by ultrasonic irradiation (20 kHz, a power consumption of 560 W, an irradiation time of 3 hours) at 32° C. was carried out.

(Post-Treatment Step)

Post-treatment step was carried out in the same manner as in Example 1 to obtain a conductive polymer-containing dispersion having a pH of 4.4.

Comparative Example 2

(Monomer Dispersion Preparation Step and Polymerization Step)

A monomer dispersion was prepared and a polymerization reaction was carried out in the same manner as in Example 1.

(Dispersion Treatment Step)

The obtained reaction solution was transferred to a 5 L stainless-steel vessel equipped with an ultrasonicator and a circulation pump, and a dispersion treatment by ultrasonic irradiation (20 kHz, a power consumption of 560 W) at 32° C. was initiated. After a time course of 30 minutes from the beginning of the dispersion treatment, the viscosity of the dispersion abnormally increased, thus making it difficult to continue the dispersion treatment.

TABLE 1

|  |  | Example 1 | Example 2 | Example 3 | Example 4 | Comparative Example 1 | Comparative Example 2 |
|---|---|---|---|---|---|---|---|
| In monomer dispersion |  |  |  |  |  |  |  |
| 3,4-Ethylenedioxy thiophene | [g] | 35.0 | 28.0 | 35.0 | 42.5 | 28.0 | 35.0 |
| Sodium polystyrene sulfonate (12 mass %) | [g] | 350 | 280 | 350 | 425 | 280 | 350 |
| Seed particles that have been converted into colloid protected by the polyanion (15 mass %) | [g] | 452 | 361 | 452 | 548 | 361 | 452 |
| Water | [g] | 2024 | 2232 | 2024 | 1822 | 2232 | 2024 |
| Sodium peroxodisulfate | [g] | 73.6 | 58.9 | 73.6 | 89.2 | 58.9 | 73.6 |
| Iron (III) sulfate hexahydrate (1 mass %) | [g] | 86.0 | 68.8 | 86.0 | 104 | 68.8 | 86.0 |
| Polymerization step |  |  |  |  |  |  |  |
| Polymerized product concentration (A) | [Mass %] | 4.8 | 3.8 | 4.8 | 5.8 | 3.8 | 4.8 |
| Amount of water added after polymerization step | [g] | 604 | 0 | 604 | 1029 | 0 | 0 |
| Polymerized product concentration (C) before beginning of dispersion treatment | [Mass %] | 3.8 | 3.8 | 3.8 | 3.8 | 3.8 | 4.8 |
| Dispersion treatment step |  |  |  |  |  |  |  |
| Amount of water added in dispersion treatment step | [g] | 0 | 699 | 696 | 698 | 0 | 0 |
| Time elapsed before adding water | [h] | — | 1.5 | 1.5 | 1.5 | — | — |
| Time elapsed before adding water | [%] | — | 50 | 50 | 50 | — | — |
| Polymerized product concentration (B) after dispersion treatment step | [Mass %] | 3.8 | 2.9 | 2.9 | 2.9 | 3.8 | — |
| (B)/(A) |  | 0.79 | 0.76 | 0.60 | 0.50 | 1.00 | — |
| (B)/(C) |  | 1.00 | 0.76 | 0.76 | 0.76 | 1.00 | — |
| pH |  | 4.4 | 4.5 | 4.6 | 4.4 | 4.4 | — |
| Viscosity | [mPa · s] | 31 | 18 | 19 | 22 | 29 | — |
| Surface resistance | [Ω/□] | 10.7 | 11.5 | 10.5 | 8.3 | 13.0 | — |

As can be understood from the results shown in Table 1, it was found that in Examples 1, 3, and 4, even when the concentration of the polymerized product was higher than that in Comparative Example 1, i.e., even when the production efficiency in the polymerization step was increased, a conductive polymer-containing dispersion having a comparable or lower viscosity than Comparative Example 1 was obtained, and that the surface resistance of a film formed of the dispersion was lower than those of Example 2 and Comparative Example 1, in which the concentrations of the polymerized product were lower. In Comparative Example 2, in which the amounts of raw materials blended were the same as those in Example 1 but water was not added, it was not possible to obtain a solution undergone dispersion treatment.

Accordingly, it can be said that by controlling the concentration of the polymerized product in each of the polymerization step and the dispersion treatment step by adjusting the amount of water added in the production method of the present invention, a conductive polymer-containing dispersion having low viscosity can be efficiently obtained, and the conductivity of a conductive polymer can be improved.

The invention claimed is:

1. A method for producing a conductive polymer-containing dispersion, the method comprising:
 a polymerization step of subjecting a monomer that is to be a constitutional unit of a conjugated conductive polymer to a polymerization reaction in a mixed solution comprising the monomer, a polyanion, and a dispersion medium to produce a polymerized product; and
 a dispersion treatment step of performing a dispersion treatment on a reaction solution obtained in the polymerization step to prepare a dispersion of the polymerized product, wherein
 the dispersion medium is added one or more times during the dispersion treatment step to make a mass concentration (B) of the polymerized product in the dispersion after the dispersion treatment step lower than a mass concentration (A) of the polymerized product in the reaction solution,
 the dispersion medium is added after a time course of at least 10% of a time required for the dispersion treatment from a beginning of the dispersion treatment, and
 the mass concentration (B) is not more than 0.95 times a mass concentration (C) of the polymerized product in the dispersion before the beginning of the dispersion treatment.

2. The method for producing a conductive polymer-containing dispersion according to claim 1, wherein the mass concentration (B) is not more than 0.95 times the mass concentration (A).

3. The method for producing a conductive polymer-containing dispersion according to claim 1, wherein the mixed solution comprises seed particles that have been converted into colloid protected by the polyanion.

4. The method for producing a conductive polymer-containing dispersion according to claim 3, wherein the seed particles are a polymer comprising an ethylenically unsaturated monomer as a constitutional unit.

5. The method for producing a conductive polymer-containing dispersion according to claim 1, wherein at least any of the polyanion and seed particles that have been converted into colloid protected by the polyanion is further added in the polymerization step.

6. The method for producing a conductive polymer-containing dispersion according to claim 1, further comprising a monomer dispersion preparation step of adding the monomer and the polyanion to the dispersion medium to prepare a dispersion of the monomer before the polymerization step.

7. The method for producing a conductive polymer-containing dispersion according to claim 6, wherein the monomer dispersion comprises seed particles that have been converted into colloid protected by the polyanion.

8. The method for producing a conductive polymer-containing dispersion according to claim 6, wherein the monomer is dispersed by ultrasonic irradiation in the monomer dispersion preparation step.

9. The method for producing a conductive polymer-containing dispersion according to claim 1, wherein the polymerized product is dispersed by ultrasonic irradiation in at least any of the polymerization step and the dispersion treatment step.

10. The method for producing a conductive polymer-containing dispersion according to claim 1, wherein
the dispersion medium in the mixed solution comprises water, and
the polymerization reaction is carried out with one or more oxidizing agents selected from the group consisting of peroxodisulfuric acid and a salt thereof.

11. The method for producing a conductive polymer-containing dispersion according to claim 1, wherein the polyanion is a polymer having a sulfonic acid group.

12. The method for producing a conductive polymer-containing dispersion according to claim 1, wherein a total amount of the polyanion used is an amount such that an anionic group in the polyanion is 0.25 to 30 mol per 1 mol of the monomer.

13. The method for producing a conductive polymer-containing dispersion according to claim 1, wherein the monomer comprises one or more selected from the group consisting of an optionally substituted pyrrole, an optionally substituted aniline, and an optionally substituted thiophene.

14. The method for producing a conductive polymer-containing dispersion according to claim 1, wherein the monomer comprises a compound represented by formula (1) below:

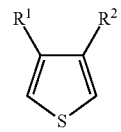

(1)

wherein $R^1$ and $R^2$ each independently represent any of a hydrogen atom, a hydroxyl group, an optionally substituted alkyl group having 1 to 18 carbon atoms, an optionally substituted alkoxy group having 1 to 18 carbon atoms, or an optionally substituted alkylthio group having 1 to 18 carbon atoms; or $R^1$ and $R^2$ are bonded to each other to form an optionally substituted alicyclic ring having 3 to 10 carbon atoms, an optionally substituted aromatic ring having 6 to 10 carbon atoms, an optionally substituted oxygen atom-containing heterocyclic ring having 2 to 10 carbon atoms, an optionally substituted sulfur atom-containing heterocyclic ring having 2 to 10 carbon atoms, or an optionally substituted sulfur atom and oxygen atom-containing heterocyclic ring having 2 to 10 carbon atoms.

* * * * *